United States Patent
Weyrauch et al.

(10) Patent No.: US 6,178,290 B1
(45) Date of Patent: Jan. 23, 2001

(54) WATER FILTER DEVICE HAVING A COLLECTING POT AND A HEATING ELEMENT

(75) Inventors: Detlev Weyrauch, Kleinmaischeid; Holger Henke, Schwalbach, both of (DE)

(73) Assignee: Brita GmbH (DE)

(*) Notice: Under 35 U.S.C. 154(b), the term of this patent shall be extended for 0 days.

(21) Appl. No.: 09/415,468

(22) Filed: Oct. 8, 1999

(30) Foreign Application Priority Data

Oct. 9, 1998 (DE) .............................................. 198 46 583

(51) Int. Cl.[7] ...................................................... F24H 1/18
(52) U.S. Cl. .......................................... 392/445; 392/447
(58) Field of Search .................................... 392/442, 445, 392/447, 450; 210/257.1, 477; 219/428, 432, 433

(56) References Cited

U.S. PATENT DOCUMENTS

| 3,662,674 | * | 5/1972 | Clausse | 99/283 |
|---|---|---|---|---|
| 3,814,004 | * | 6/1974 | Thornton | 99/283 |
| 4,357,520 | * | 11/1982 | Taylor | 219/330 |
| 4,495,404 | * | 1/1985 | Carmichael | 219/281 |
| 5,637,214 | | 6/1997 | Kahana . | |
| 5,860,354 | | 1/1999 | Jouatel et al. . | |

FOREIGN PATENT DOCUMENTS

| 0 880 986 | 12/1998 | (EP) . |
|---|---|---|
| 0 880 986 A2 | 12/1998 | (EP) . |
| 2294631 | 5/1996 | (GB) . |
| 2 294 631 | 8/1996 | (GB) . |
| WO 95/03733 | 2/1995 | (WO) . |
| WO 96/22045 | 5/1996 | (WO) . |
| WO 96/22045 | 7/1996 | (WO) . |
| WO 99/10076 | 3/1999 | (WO) . |

* cited by examiner

Primary Examiner—Teresa Walberg
Assistant Examiner—Thor Campbell
(74) Attorney, Agent, or Firm—Paul & Paul

(57) ABSTRACT

A water filter device has a collecting pot (1) with a spout (2) disposed at the front, with a handle (3) disposed at the rear in opposite relationship, and with an electrical heating element (5) arranged in the lower boiling region of the collecting pot (1), in this arrangement the collecting pot (1) is closable at the top by a lid (4) and provided in the interior is a filter insert (8) in which a filter cartridge (9) which can be filled with a purification agent is arranged so that untreated water can be poured into the filter insert (8) by way of the filter cartridge (9) and can pass due to the force of gravity to at least under the filter cartridge (9). The filter insert (8) is arranged in an insulating insert (6) in such a way that provided between the boiling region at the bottom in the collecting pot (1) and the filter insert (8) with the filter cartridge (9) is a partition wall (10, 10a) which is generally arranged at a spacing from the filter insert (8) and which is at least partially in the form of a horizontally extending plate. Provided in the lower region of the insulating insert (6) is a through opening (7) for the connection between the discharge end of the cartridge (9) and the collecting pot (1). So that such a water filter device can be simplified to the effect that the filter insert (8) can be removed separately from the insulating insert (6), in which case the inserts (6, 8) can be better cleaned, the pouring properties of the pot are improved and operation of the device can be better adapted to different amounts of water to be purified, it is provided in accordance with the invention that the through opening (7) is arranged in the rear region (D) of the collecting pot (1) which is in opposite relationship to the spout (2), the substantially horizontally extending part (10a) of the partition wall (10) is inclined rearwardly relative to the through opening (7) and extends above the boiling region at least partially over the cross-section of the collecting pot (1).

8 Claims, 9 Drawing Sheets

WATER FILTER DEVICE HAVING A COLLECTING POT AND A HEATING ELEMENT

Figure 1:
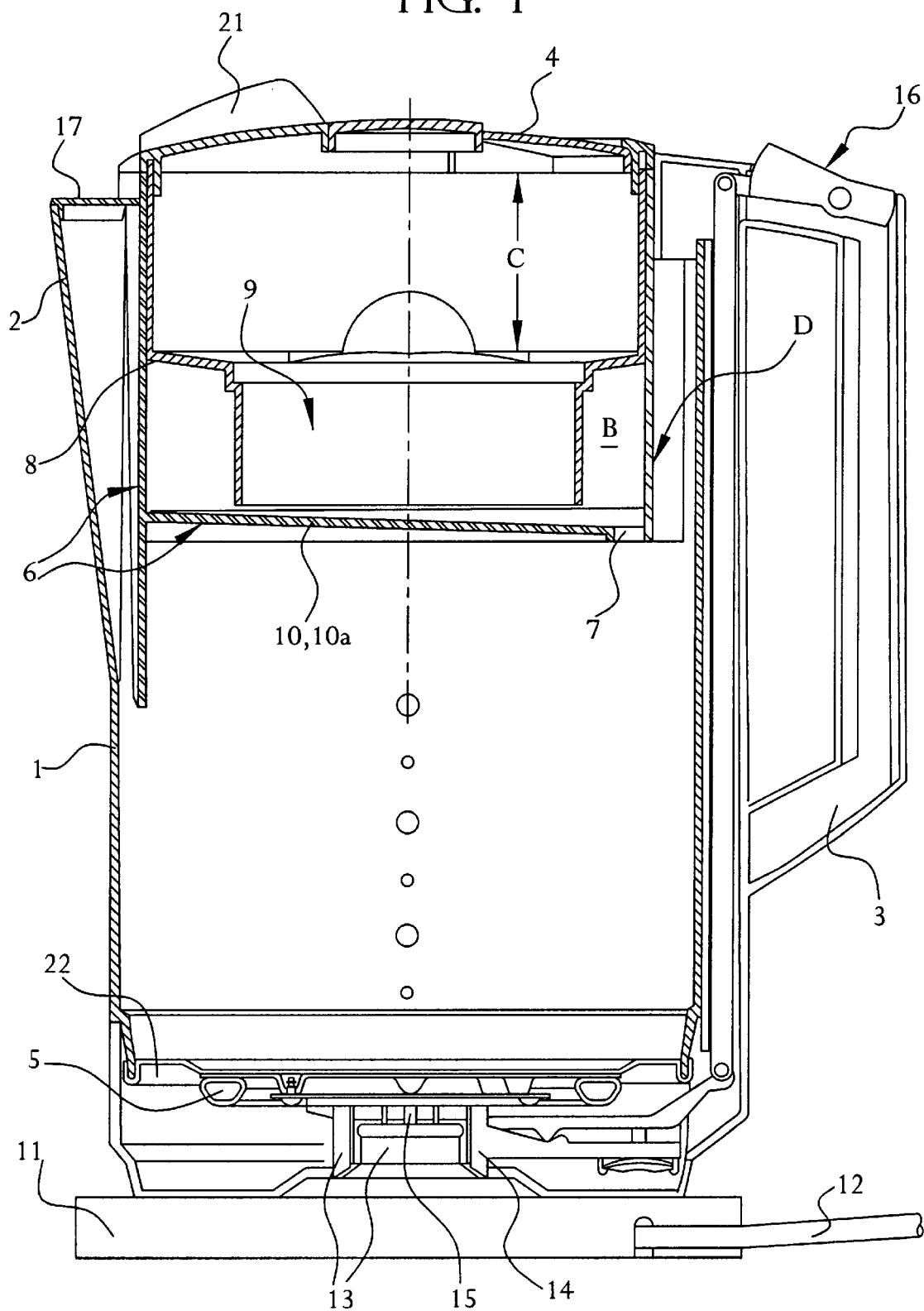

The invention concerns a water filter device having a collecting pot with a spout which is disposed at the top front, a handle which is disposed at the rear in opposite relationship, and an electrical heating element which is arranged in the lower boiling region of the collecting pot, wherein the collecting pot is closable at the top by a lid and provided in the interior is a filter insert in which a filter cartridge which can be filled with a purification agent is arranged so that untreated water can be poured by way of the filter cartridge into the filter insert and can pass due to the force of gravity to at least below the filter cartridge, wherein the filter insert is arranged in an insulating insert in such a way that provided between the boiling region in the collecting pot and the filter insert with the filter cartridge is a partition wall which is generally arranged at a spacing from the filter insert and which is at least in part in the form of a substantially horizontally extending plate, and wherein provided in the lower region of the insulating insert is a through opening for the communication between the discharge end of the filter cartridge and the collecting pot.

There are various water filter devices with an electrical heating element, in which the water is urged by way of a motor-driven pump through the handle and thus also through the filter insert disposed in the handle and is then conveyed into the collecting pot. Such devices frequently have an excessively bulky handle and the overall design configuration is also complex and from time to time temperamental in operation as it involves a pressurised system. Descaling is also difficult and there are problems with indication of the filling level. Those systems are used nonetheless because the filter cartridge in the handle, with the purification agent, is not exposed to the effect of the heat of the heating element, with consequential harm thereto.

A water filter device which is similar to the kind described in the opening part of this specification is also already known, in which however the filter insert is formed in one piece with the funnel and a shaft-like depression in front region of the funnel is arranged at the bottom beside the spout. A further cup-shaped wall configuration is also disposed as an insulating insert on the funnel at the bottom around the shaft-like depression of the filter insert, in order to prevent the heat of the heating element or the heated water from having a damaging influence on the filter cartridge. It is only the bottom region of the insulating insert that has a small. substantially horizontally extending plate which at the centre, like the filter insert, has a through opening so that the purified water issuing from the filter cartridge can pass through that through opening into the boiling region.

This last-described water filter device can only be dismantled by a procedure whereby, together with the filter insert in the form of the funnel, the insulating insert and the filter cartridge are also removable. Both the filter cartridge and also the through opening are disposed in the front region of the collecting pot beside the spout so that, when pouring out water, a back-up accumulation can occur and particular measures must be taken so that heated water is not urged back out of the boiling region into the filter cartridge. Apart from the difficulties involved in manufacture of such a device, there are also no measures for feeding on the one hand relatively small and on the other hand relatively large amounts of water to the heating element. On the contrary, it is always the same amount of untreated water that will pass through the filter cartridge and the through opening into the boiling region.

Therefore the object of the present invention is so to simplify a water filter device of the kind set forth in the opening part of this specification that the filter insert in which the filter cartridge is disposed can be separately removed from the insulating insert, possibly freshly fitted with a filter cartridge, in which case the inserts can be better cleaned, the pouring properties of the pot are improved, and operation of the water filter device can be better adapted to different amounts of water to be purified.

In accordance with the invention that object is attained in that the through opening is arranged in the rear region of the collecting pot which is in opposite relationship to the spout and the substantially horizontally extending part of the partition wall is inclined downwardly towards the through opening and extends "at the level above the boiling region" in the sense of "above the boiling region" at least partially over the cross-section of the collecting pot. The arrangement of the through opening in the rear region of the collecting pot affords better pouring properties, the centre of gravity is desirably closer to the handle, and a back-flow of heated boiled water into the filter cartridge is also substantially excluded. The partition wall mechanically and thermally separates the boiling region from the untreated water region and is above the boiling region, unlike the case with the known devices. Due to the system being operated by the force of gravity, the volume flow is advantageously afforded by virtue of the geometry of the inserts and the volume flow can be well matched to the kinematics of the ion exchanger. That gives good purification properties. When dealing with a mixture of the purification agent of for example 30% carbon and 70% ion exchanger, it is possible to remove substances affording taste and smell from the water due to the action of the carbon while the ion exchanger provides for radical decarbonisation with the desired filtering speed.

These per se known basic functions of a water filtration unit can be implemented with the water purification device according to the invention even when the heating element is switched off. In accordance with the invention this filter capability can be fully maintained in accordance with the invention when the use is expanded in the described manner by the heating element and at the same time water to be purified is also additionally heated. By virtue of the provision of the thermal insulation the filter cartridge and its purification agent contained therein can be kept for example at room temperature. That makes it possible to promote and stabilise the filtration kinematics.

In a corresponding configuration, it is possible for the filter insert to be removably connected in the insulating insert so firmly that untreated water which is poured on over the filter cartridge certainly cannot pass directly to the bottom of the insulating insert and thus also the through opening but must first pass through the filter cartridge. That therefore affords a practical dismantling option and the inserts can be easily satisfactorily cleaned.

Apart from the possibility of fitting filter cartridges of different configurations in a water filter device of the kind described hereinbefore and thus already adapting the operation involved to different amounts of water to be purified, it is particularly desirable in accordance with the invention if the through opening is provided with a closure device. More specifically, it is then possible for the untreated water region above the filter cartridge to be completely filled with water and nonetheless for only a desired amount of purified water which has flowed out of the filter cartridge to be passed through the through opening into the boiling region. When that amount is reached, the further through flow can be terminated by the closure device. It is known to be harmless if the purification agent in the filter cartridge is in water or also if untreated water remains above the filter cartridge.

If there is a wish for the total amount of untreated water to be passed to the boiling region, then the inclination of the substantially horizontally extending part of the partition wall towards the through opening makes it possible for no undesired residual amounts to be left in the insulating insert.

In principle the partition wall can involve various shapes and positions. A part thereof extends substantially horizontally, which means that this part which in a preferred embodiment is for example plate-shaped or disc-shaped only extends generally horizontally, but nonetheless it can involve a slight inclination towards the through opening. In another embodiment the partition wall, outside that primarily horizontally extending part, can also be in the shape of an upwardly open cup which forms the shaft-like depression of the insulating insert and which is formed in one piece with the insulating insert. A filter insert of a suitable configuration which is also cup-shaped can be arranged in sealing relationship in that shaft-like depression, and the filter cartridge can be fitted in the filter insert.

However, even without that shaft-like depression, it is desirable in accordance with the invention for the insulating insert if it is in the form of an upwardly open cup and if its bottom is formed by the substantially horizontal part of the partition wall. In both embodiments, this substantially horizontal part of the partition wall is then that part which divides off the boiling region downwardly so that either water which has just been purified and/or water which is to be purified is disposed thereabove. That mechanical separation at the same time also affords thermal insulation for the water which is disposed above that partition wall, or for the space thereabove, if the space is not filled with water. It is then possible for the filter cartridge to be arranged thereabove or therebeside and for untreated water to be passed through the purification agent without the water which has then just been purified already having reached a temperature which would be harmful to the purification agent or one of its constituents.

In a further advantageous embodiment of the invention the substantially horizontal part of the partition wall extends substantially over the entire cross-section of the collecting pot in such a way that there is an insulating space or chamber under the untreated water region and above the boiling region. In this embodiment, in the above-described manner, the untreated water may advantageously not be reliably heated. In this embodiment, no shaft-like depression is provided in the partition wall forming the bottom of the cup-shaped insulating insert. On the contrary the bottom of the partition wall is the substantially horizontal part of the partition wall (this differs from the substantially vertically upwardly extending side walls which in part can also belong to the insulating insert). The essential function of the insulating insert is to provide for thermal and spatial/mechanical separation of the boiling region from regions disposed thereabove.

If now another preferred embodiment having the above-mentioned shaft-like depression is considered, then the water filter device is preferably characterised in that disposed in the plate-like partition wall which is inclined towards the through opening, of the insulating insert, is a shaft-like depression in which the through opening and the filter insert are disposed. In this embodiment the substantially horizontal part of the partition wall, namely the disc or plate which is slightly inclined towards the shaft-like depression forms a first part of the bottom of the generally cup-shaped insulating insert, and the shaft-like depression forms the remaining bottom part of the insulating insert. In that case, the filter cartridge can be substantially completely disposed in the shaft-like depression, with the result that untreated water which is poured into the insulating insert at the top can in its entirety leave the filter cartridge and the shaft-like depression to pass into the boiling region, only after passing through the filter cartridge. In this embodiment also the insulating insert, with its horizontal part of the partition wall and also with its part of the shaft-like depression, spatially and mechanically separates the boiling region relative to the untreated water region and the region of the filter cartridge, that is to say the purification region. In addition thermal isolation is effected by all parts of the partition wall.

The second embodiment of the invention as just described above is suitable for a known form of filter cartridges which have found wide-spread use in domestic water filters.

The other first embodiment described further hereinbefore, in which the bottom of the cup-shaped insulating insert comprises substantially only the horizontally extending partition wall, can be used in relation to a wider filter cartridge of larger diameter but smaller height, in comparison with that referred to above. While the filter cartridge of the embodiment with the shaft-like depression without a lid can be of a height of about 10 cm, in the initially above-described embodiment with the wider and shorter filter cartridge, it is possible to use such a cartridge which is about 3 cm in height.

The boiling volume is referred to as the size of the boiling region (minus the head space for the boiling operation). In a preferred embodiment this boiling volume is 1.5 litres in size.

The above-mentioned funnel corresponds to the untreated water region and in the preferred embodiment is of a size of 0.75 litre, that is to say half the boiling volume.

The funnel and the boiling volume generally determine the structural height and the filter height of the water purification device, the overall height of which should therefore generally not exceed 30 cm.

In a good practical embodiment which is preferred in accordance with the invention the diameter of the collecting pot is 15 cm. The diameter of the filter cartridge of the first-described, short wide kind is 8.5 cm and its height is 3.5 cm.

In accordance with the invention, for the embodiment with the shaft-like depression, it is further desirable if the filter cartridge is disposed at a spacing from the bottom of the filter insert, forming a filtrate intermediate storage means, and a discharge opening which can be brought into alignment with the through opening in the insulating insert is provided beside the bottom of the filter insert. It will be appreciated that the filter cartridge is open downwardly so that purified water can flow downwardly into the filtrate intermediate storage means and can possibly accumulate there. The described filtrate intermediate storage means is disposed in the filter insert. It is in communication with the space on the outside above the above-mentioned discharge opening which is in the upwardly extending wall of the filter insert. A plurality of discharge openings can possibly also be provided in the wall of the filter insert. The purified water in the filtrate intermediate storage means can however escape from the filter insert outwardly through the discharge opening in the filter insert only when the so-called through opening which is in the wall of the insulating insert is in alignment above the discharge opening. More specifically, the outlet for the purified water into the boiling region is then free by virtue of the discharge opening and the through opening being in mutually superposed relationship.

In a specific embodiment of the invention, provided in the region of the through opening outside same in the insulating insert is an annular outlet passage which is open downwardly in an annular configuration, the arrangement being such that the purified water can pass out of the filtrate intermediate storage means by way of the two aligned openings into the annular outlet passage and from there can flow downwardly into the boiling region.

It will be appreciated that with this structure in respect of the discharge flow openings and passages, that a closure device for example for the through opening can be easily installed using simple means.

A desirable embodiment of the invention is characterised in that the filter insert is rotatable in the depression of the insulating insert and coupling means are provided in the cover for rotational actuation. More specifically, if the filter insert is rotated by a drive from above, then the described discharge opening (in the filter insert) can be brought out of alignment with respect to the through opening (in the insulating insert) which is disposed on the outside directly therebeside and in contact therewith. Depending on the rotational position of the filter insert, it is possible in that way to close or open the through opening. In that respect it is particularly desirable if the coupling means for rotational actuation of the filter insert are provided in the cover. In other words, the filter insert has upstanding portions which extend substantially vertically through the untreated water region in such a way that suitably congruent portions permit rotational movement of the filter insert, from the cover, without the fingers having to be put into the untreated water region.

It is further desirable in accordance with the invention if a slider switch arranged on the handle can be brought into engagement with the coupling means for rotational actuation. It is assumed therefore that vertically upwardly extending filter insert limbs which can be surrounded by untreated water are fixedly secured to the filter insert. Then, a rotary knob should be disposed above the filter insert in the cover, with corresponding rotary knob limbs extending vertically downwardly from the rotary knob in such a way that they can be brought into engagement with the filter insert limbs. When then the rotary knob is turned, the filter insert is rotated by way of the interengaging limbs as a coupling means. If now a slider switch can also be brought into engagement with the coupling means among which the rotary knob can also be counted, then the position of the slider switch can be coupled to the rotational position of the filter insert. That coupling can mean for example that it is only in a given rotational position of the filter insert that the slider switch can be actuated, with the consequence that it is only then that the heating element can be brought into heating operation. Desirably, the position adopted is that rotational position of the filter insert at which the two openings are out of alignment with each other in order then to actuate the slider switch and therewith the heating element. In practical operation this means that the user must first bring water to be purified into the lower part of the boiling region, whereafter he moves the rotary knob into the closed position in order only thereafter to switch on the heating element. Then, even heat which rises from the heating element will not be readily able to pass by a backflow effect downwardly into the filter cartridge or even the purification agent. This measure also advantageously serves for thermal isolation for the purification agent from the heat generated by the heating element.

In spite of the thermal and also spatial separation of the boiling region from the other functional regions of the water filter device according to the invention, it can be simplified in regard to manufacture and also use for the filter insert is just as separate from the filter cartridge as the insulating insert. The device according to the invention can therefore easily be fitted with a fresh filter cartridge, with a small number of steps. In operation the appropriate arrangements of through opening, filter cartridge, handle and spout predetermine good pouring properties, while nonetheless the unit can be satisfactorily cleaned. The configuration and structure of the insulating insert on the one hand and the filter insert on the other hand make it possible to have various different design configurations for closure devices for the through opening. In that way, in operation, depending on the user wishes, the through opening can be opened or closed logically and in a clearly visible fashion so that little or a great deal of water to be purified can pass into the boiling region.

Figure 2:
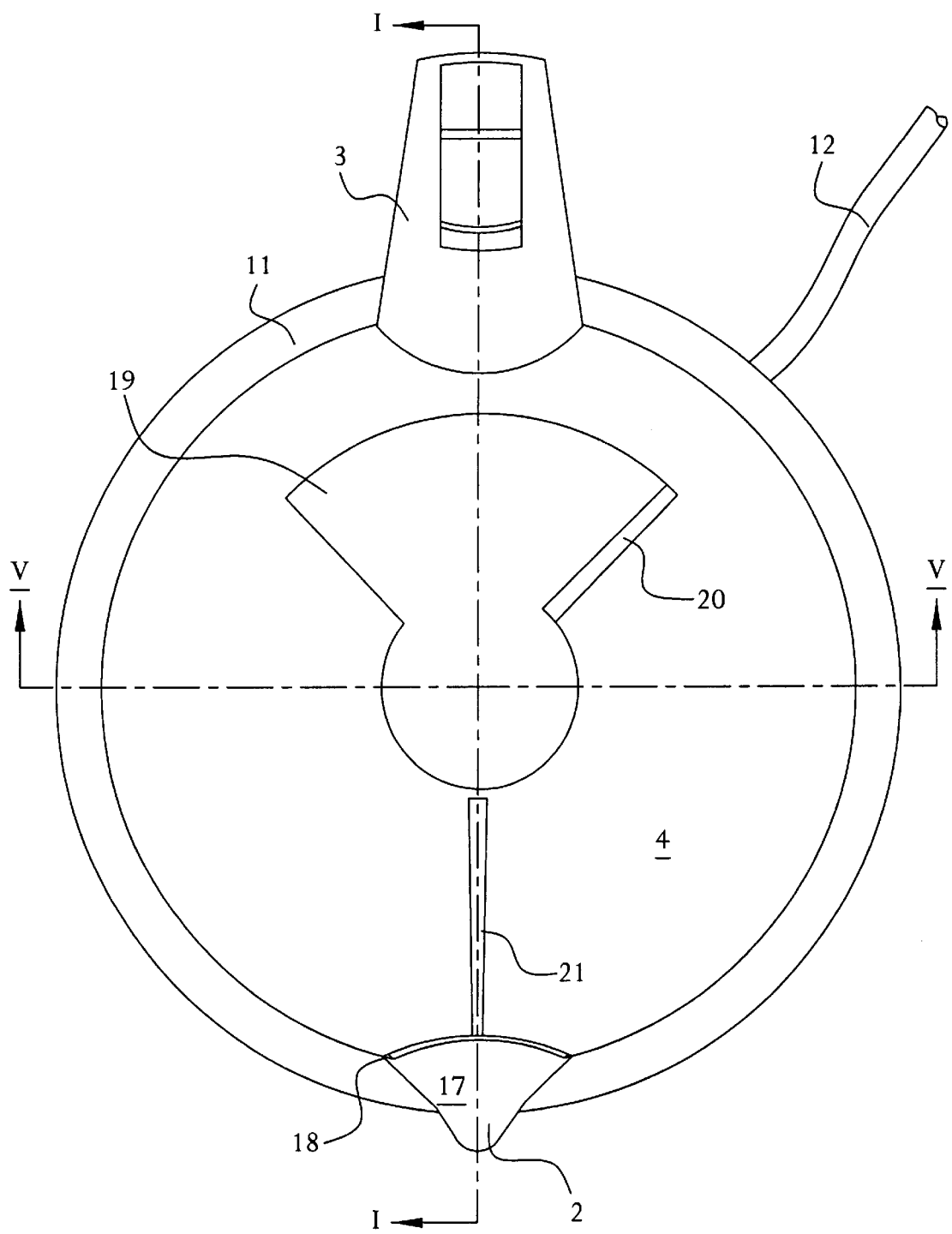
Figure 3:
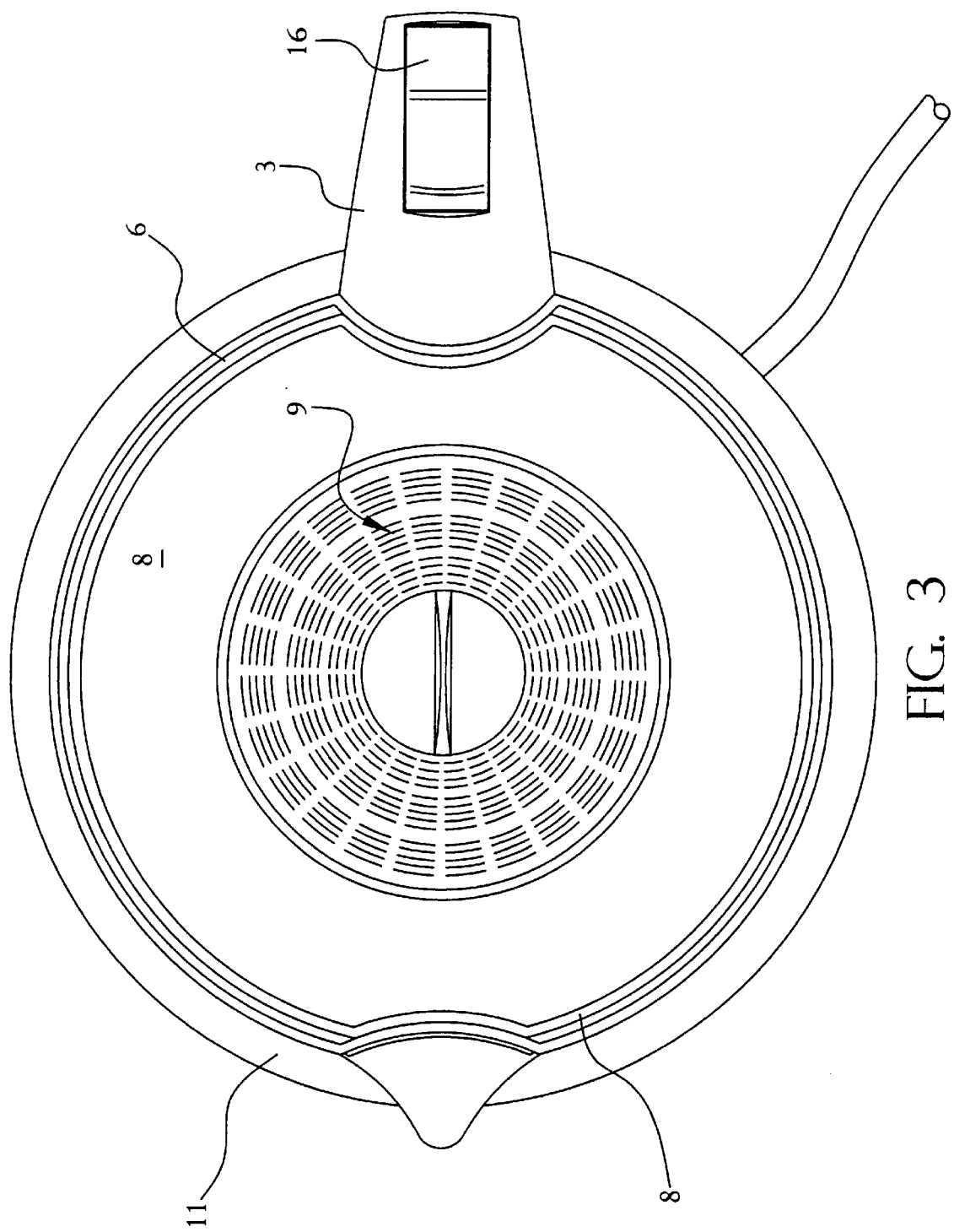
Figure 4:
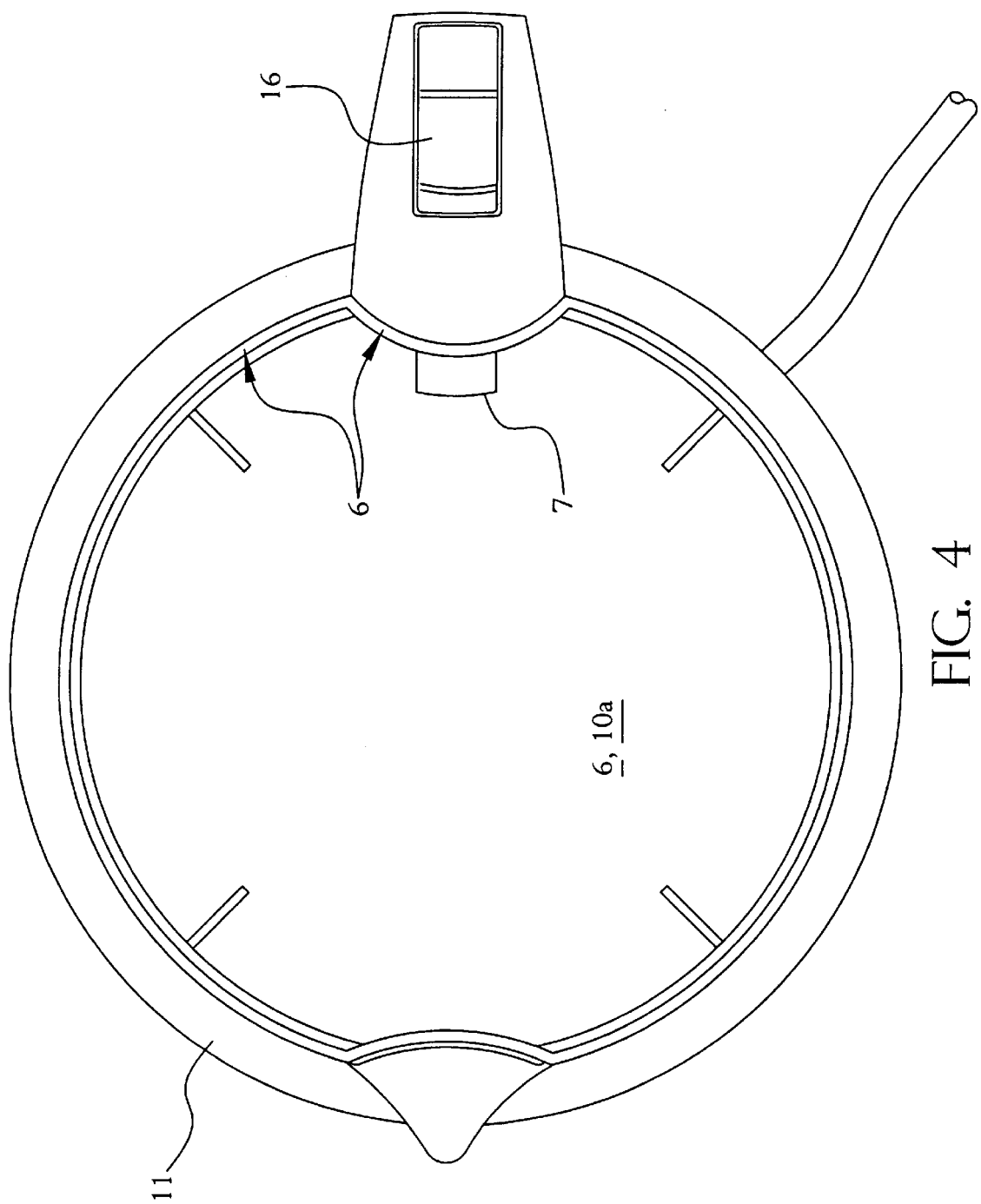
Figure 5:
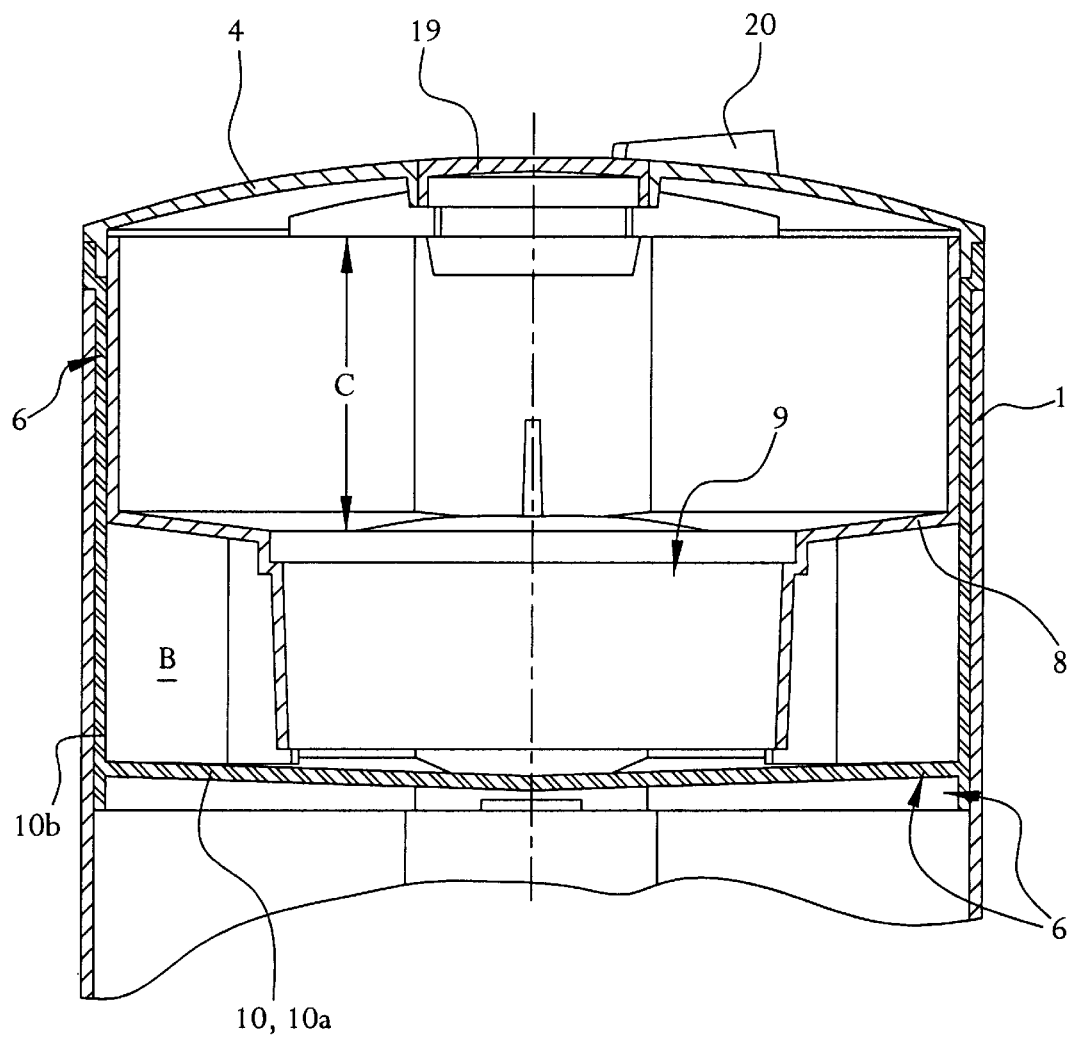
Figure 6:
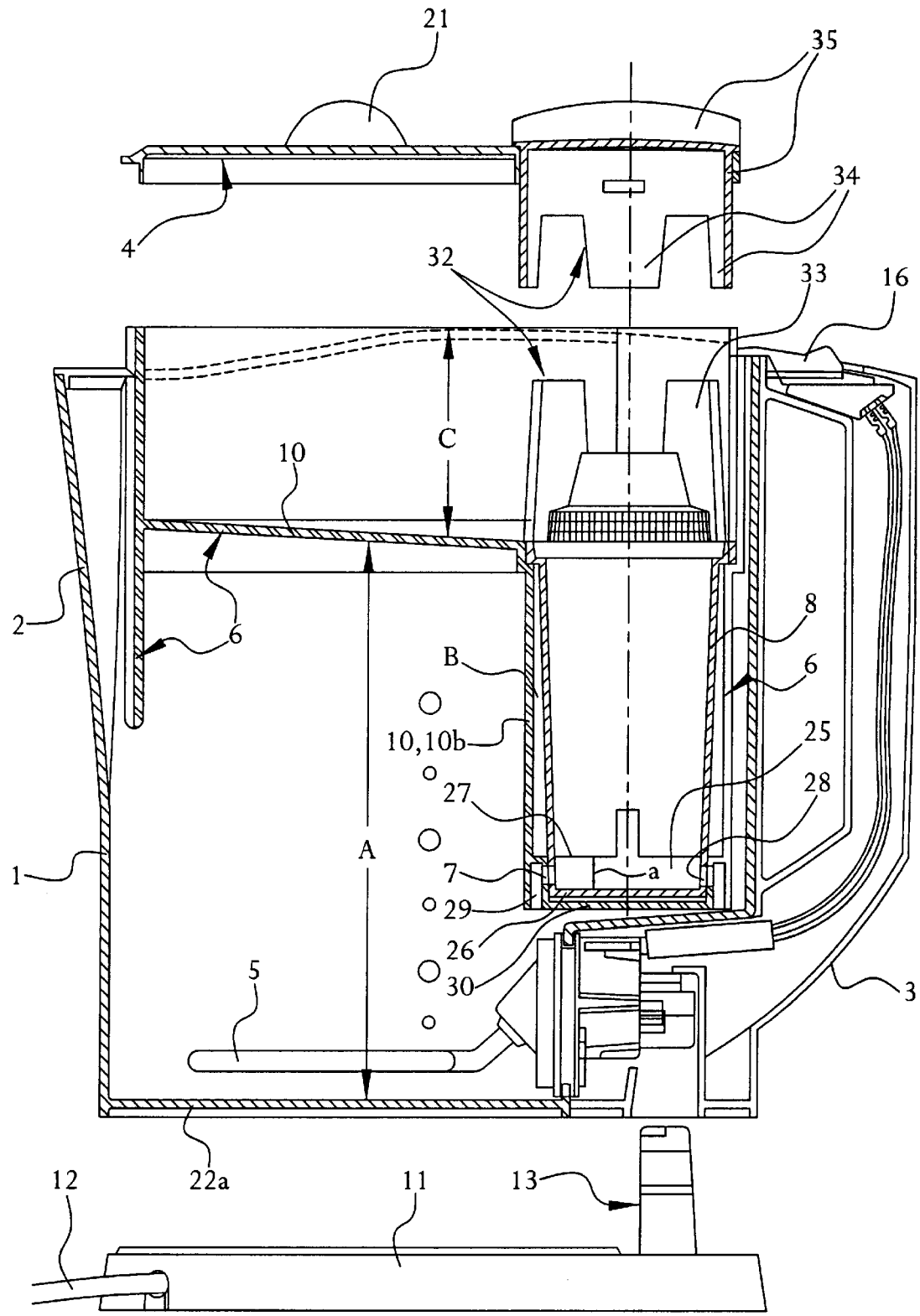
Figure 7:
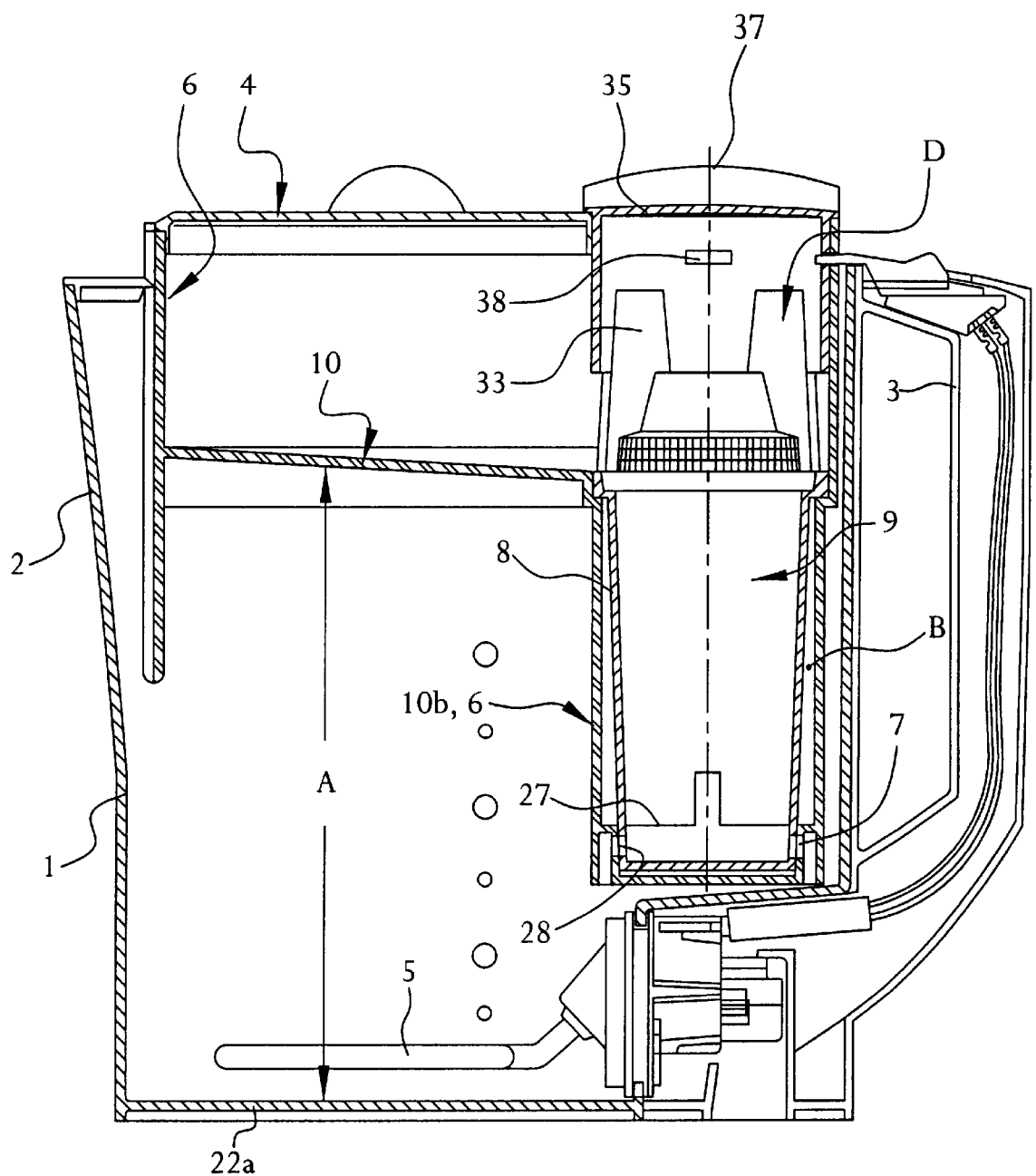
Figure 8:
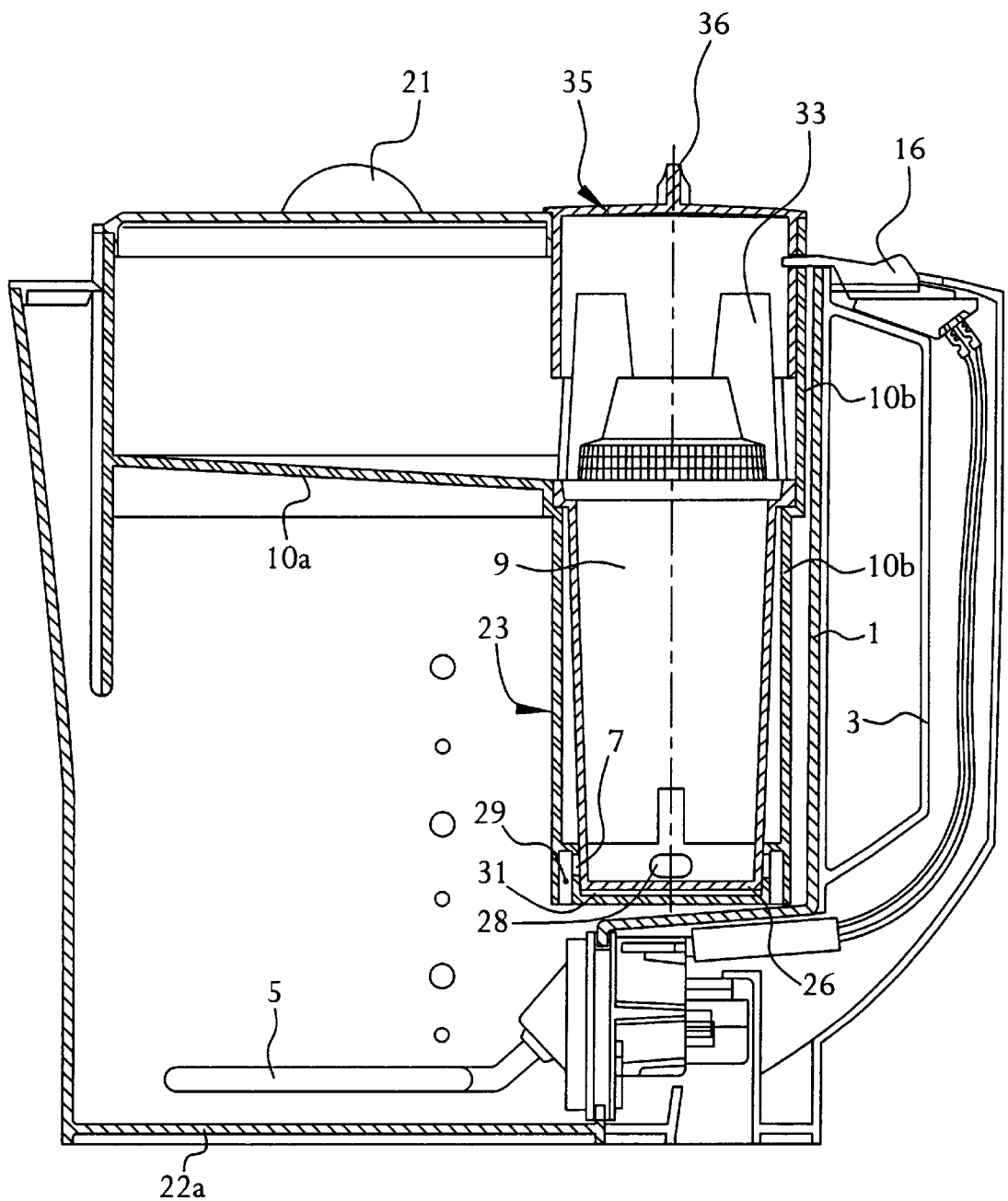
Figure 9:
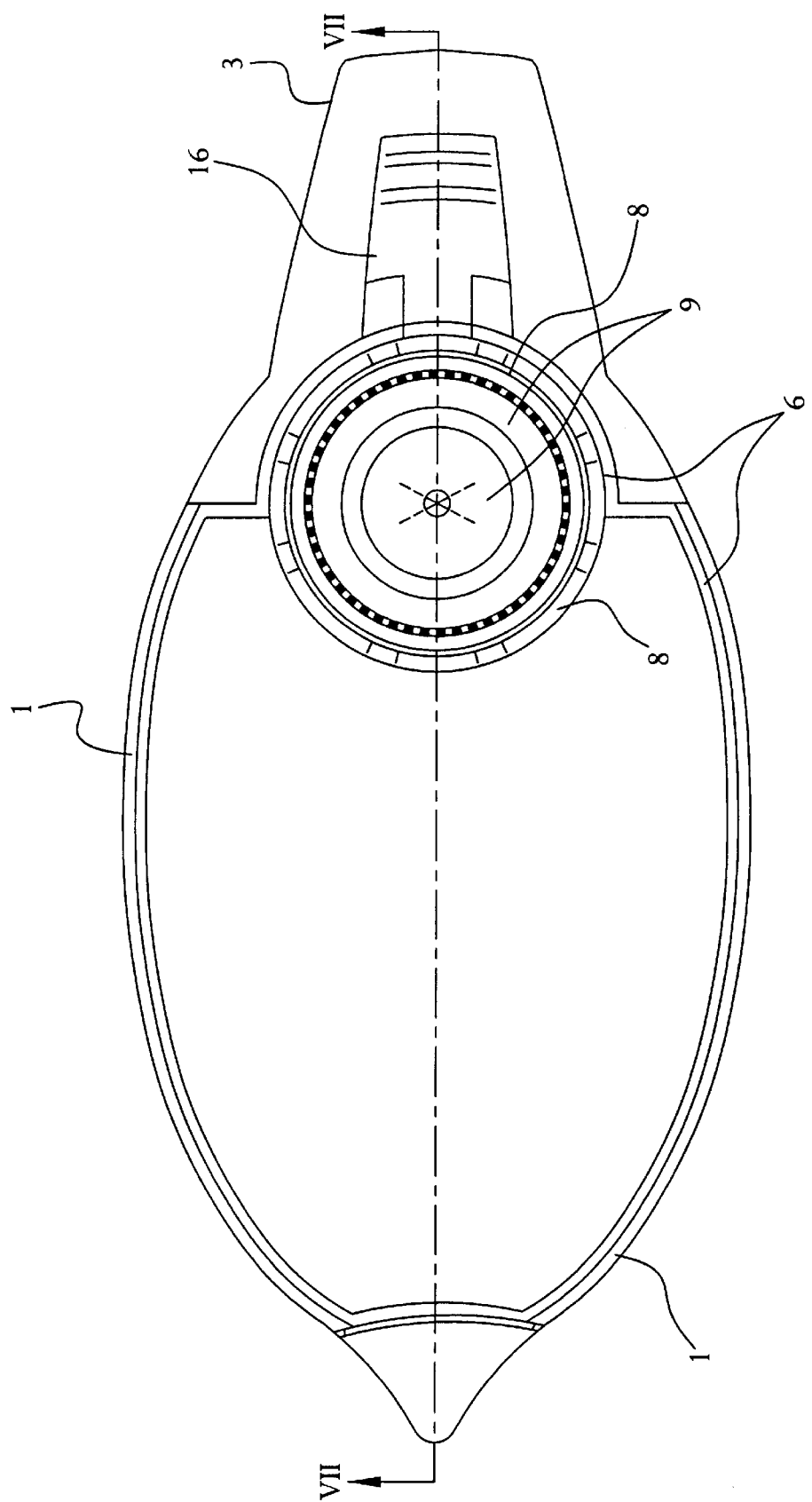

Further advantages, features and possible uses of the present invention will be apparent from the following description of preferred embodiments with reference to the accompanying drawings in which:

FIG. 1 is a partly broken-away side view of a water filter device of a first embodiment with a short filter cartridge of larger diameter, FIG. 2 is a plan view onto the cover with a rotatable closure, FIG. 3 is a similar plan view to FIG. 2, but in which the cover has been removed from the collecting pot and the view is onto the filter cartridge, FIG. 4 is a further similar plan view to FIG. 2 or FIG. 3 but with the filter insert removed so that the view is onto the substantially horizontal part of the partition wall extending over the entire cross-section of the collecting pot, FIG. 5 is a similar cross-sectional view to FIG. 1 but in a direction perpendicular to that shown in FIG. 1, in broken-away form, illustrating the upper part of the entire device, FIG. 6 is a similar cross-sectional view to FIG. 1 but of a second embodiment with a collecting pot which is elongate when viewed from above. wherein the cover is correspondingly shown separately lifted off at the top and the electrical plug base is also shown separately removed at the bottom, FIG. 7 is a similar cross-sectional view to FIG. 6, also of the same embodiment as FIG. 6, but wherein the electrical plug base is removed and the cover is fitted onto the pot, FIG. 8 is a similar cross-sectional view to FIG. 7 but with the rotary knob being turned through 90° into another position at top right and with the slider switch also moved into its switch-on position, and FIG. 9 is a plan view of the collecting pot of the second embodiment of FIGS. 6 to 8, but showing the oval cover in the removed condition and thereby viewing directly onto the filter cartridge and the filter insert surrounding same, which insert has been previously rotated into the closed position.

The first embodiment is illustrated in FIGS. 1 to 5 and the second is illustrated in FIGS. 6 to 9. The cross-sectional view in FIG. 1 is a view taken along line I—I in FIG. 2. Similarly the cross-sectional view in FIG. 7 is a view taken along line VII—VII in FIG. 9. In that respect, the cover shown in the cross-sectional views is omitted in FIGS. 2 and 9. Furthermore FIG. 5 is a view in cross-section (broken away) taken along line V—V in FIG. 2.

The collecting pot 1 with a spout 2 provided at the top front thereof and a handle 3 disposed at the rear in opposite relationship is closable at the top by a cover or lid 4. It is provided at the bottom with an electrical heating element 5 while in the upper region disposed in an insulating insert 6 with a through opening 7 is a filter insert 8 with filter cartridge 9, the arrangement being such as to afford a boiling region in the collecting pot 1 at the bottom beside the heating element 5 up to the height of the substantially horizontal part 10a of the partition wall which is generally identified by reference 10 and which is part of the insulating insert 6. Besides the boiling region A, in the first embodiment shown in FIGS. 1 to 5 above the partition wall 10 of the insulating insert 6, an insulating space B is formed by the described structure and in particular the partition wall 10 while contained thereabove and in particular over the filter cartridge 9 is the untreated water which is in the so-called untreated water region C. The insulating space B surrounds the filter cartridge 9 in an annular configuration and is also present beneath same for it is disposed between the walls of the insulating insert 6 on the one hand and the filter insert on the other hand.

The collecting pot 1 stands on an electrical plug base 11 with an electrical supply lead 12. An electrical plug connector 13 provides in per se known manner for the supply of electrical power by way of plug bars 15 which are only shown in part and which are disposed in a plug protection arrangement 14. The connected electrical heating element 5 can be switched on and off by way of a switch 16. The switch is disposed in a clearly visible position, at which the user can easily reach it, at the upper end of the handle 3.

The spout 2 is closable with a cover 17 which pivots up by way of a rotating mechanism 18 when the collecting pot is being poured out and which falls back into the closure position again when the collecting pot 1 is put back. FIG. 2 also clearly shows the rotatable closure 19 in the lid 4, with associated gripping limb 20 for pouring untreated water fresh from above into the untreated water region 2 when the lid 4 is fitted in place. The lid itself can be actuated and is to be gripped by way of the lid handle 21.

While in both embodiments the connecting pot 1 is produced from a transparent material, for example plastic material or glass, in the first embodiment the electrical heating element 5 is disposed under the so-called metal heating bottom 22 while in the second embodiment of FIGS. 6 to 9 the electrical heating element 5 is fixed above the bottom 22a of the collecting pot 1.

It will be seen that in both embodiments the through opening 7 is arranged in the rear region D of the collecting pot 1, which is in opposite relationship to the spout 2. The substantially horizontally extending part 10a of the partition wall 10 is inclined towards the through opening 7, that part 10a extending at the height above the boiling region A. In the first embodiment it is disposed predominantly in the entire cross-section of the collecting pot 10 while in the second embodiment shown in FIGS. 6 through 9 the partition wall, outside the substantially horizontally extending part 10a also has a vertically upwardly extending part 10b, by virtue of which the insulating insert 6 forms a shaft-like depression 23 in the rear region D of the collecting pot 1.

The insulating insert 6 is essentially in the form of an upwardly open cup, the bottom of which is the substantially horizontal part 10a of the partition wall 10 in plate or disc form. In the first embodiment shown in FIGS. 1 to 5 the disc is approximately circular. Extending from the edge thereof are vertically upstanding parts 10b, like the walls of the cup, and in the lower part they enclose the insulating space B and in the upper part the untreated water region C. Disposed within the annular insulating space B is a filter cartridge 9 which is held in a filter insert 8. It has a wider upper region, enclosing the untreated water region C. and the narrower lower region in which the short filter cartridge 9 of the somewhat larger diameter is disposed. The filter insert 8 is open downwardly so that the purified water can drip out of the bottom of the filter cartridge 9 directly into the insulating space B or onto the partition wall 10 and more precisely onto the substantially horizontal part 10a. That partition wall 10 is substantially flat and is inclined towards the rear region D of the collecting pot 1 as far as the through opening 7. Consequently all water will try to flow out of the insulating space B to the through opening 7. The purified water or filtrate leaves the insulating insert 6 through the opening 7. The filter insert 8 is also cup-shaped and is removably fitted in the upper region of the insulating insert. The vertical position of the filter insert 8 is ensured by virtue of resting on a plurality of support ribs 33. The connection of the insulating insert in the collecting pot 1 is afforded by being shrunk in place, clamping or by another suitable fixed connection. Both in regard to the embodiment of FIGS. 1 to 5 and also FIGS. 6 to 9, instead of the fixed connection it is also alternatively possible to ensure vertical positioning of the insulating insert 6 by a respective lateral support step 34 which rests on the upper edge of the pot 1.

In operation therefore, when the rotatable closure 19 in the lid 4 is opened, the user can pour the untreated water from above into the filter insert 8 onto the filter cartridge 9, the intake sieve of which is shown in FIG. 3. The filter cartridge 9 can be removed from the filter insert by means of the handle 24. When untreated water is poured in at the top, at room temperature, then it flows substantially still at room temperature through the through opening 7 downwardly into the boiling region A. There, the water is heated by the heating bottom and collects in the collecting pot 1 in order to be poured out as required by way of the spout 2. When the water is poured out, the water level in the boiling region A inclines in the direction such that it moves away from the opening 7. in other respects the collecting pot 1 can be handled like a conventional kettle.

The second embodiment shown in FIGS. 6 to 9 is in principle of a similar structure to the first embodiment and in operation behaves in a similar fashion, with only a few differences which are described hereinafter. The same parts of the water filter device of the second embodiment are denoted by the same references as in the first embodiment.

At the bottom in the boiling region A the heating element 5 is fluid-tightly fixed in the lower part of the collecting pot in such a way that the rearwardly outwardly extending plug connection is arranged in a space in the collecting pot 1 at the bottom on the handle. Disposed thereabove, that is to say also outside the heating element 5, is the filter cartridge 9 arranged in a shaft-like depression which is generally identified by reference numeral 23. This in practice involves a part of the cup configuration of the insulating insert 6, which accommodates the filter cartridge. While this insulating insert which is generally identified by reference numeral 6 considered overall, is again in the form of an upwardly open cup, the shaft-like depression 23 is disposed at the bottom right end of the cup (see FIG. 8). This depression 23 is formed by vertically upwardly extending parts 10a of the partition wall 10, which parts are arranged in the form of a cylindrical configuration. The partition wall 10 is in one piece with the substantially horizontal part 10a of the partition wall 10. When the lid 4 is removed from the collecting pot 1 and a view is taken from above onto the device the illustration in FIG. 9 will be seen. Shown to the left of the handle 3 is the filter cartridge 9 which is held in the filter insert 8. This once again is fitted into the insulating insert 6 in such a way that untreated water which is flowing away can only pass through the filter cartridge downwardly and into the boiling region A. Extending to the left of the cartridge 9 as far as the spout 2 is the substantially horizontal part 10a of the partition wall 10 which is part of the insulating insert 6. This horizontal part 10a is also substantially flat, it is in the form of an oval plate or disc with a large recess at the right (for the filter cartridge 9) and a small recess at the left (for the spout cover 17).

It will be seen from the views in FIGS. 6 to 8 that water which flows out of the untreated water region C can only flow away by way of the filter cartridge 9 towards the right and downwardly into the boiling region A.

That discharge flow occurs through the shaft-like depression 23 in which the filter cartridge 9 is carried and from there into the filtrate intermediate storage means 25 which extends at a spacing a (FIG. 6) from the bottom 26 of the filter insert 8 to the discharge end 27 of the filter cartridge 9. The bottom 26 of the filter insert 8 is in the shape of a circular disc. Disposed in the side walls of the filter insert 8 which extend vertically upwardly from the bottom 26 at the outside thereof, on diametrally oppositely disposed sides are discharge openings 28. The discharge openings 28 in the filter insert 8 in the opened position in FIG. 6 are in alignment with corresponding through openings 7 which are also arranged at diametrally opposite sides in the insulating insert 6. In contrast, in the view shown in FIG. 8 the filter insert 8 is turned through 90° so that the sectional view in FIG. 8 is a view onto the above-mentioned discharge opening 28. It is no longer in alignment with a through opening 7 so that the discharge for purified water is blocked in that position in FIG. 8. In the other position in FIGS. 6 and 7 purified water firstly passes from the filtrate intermediate storage means 25 through the discharge opening 28 in the filter insert 8 and thereafter through the through opening 7 in the insulating insert 6 into an annular outlet passage 9 which is disposed by virtue of two annular walls at the lower end of the shaft-like depression 23 and which is open downwardly. In that way there is a direct communication between the boiling region A and by way of the openings 7, 28 with the filtrate intermediate storage means 25. It will also be seen that a further disc-shape insulating space 31 is provided between the bottom 26 of the filter insert 8 and the bottom 30 of the shaft-like depression 23. The space 31 represents further thermal protection for the space under the filter cartridge 9 and thus for temperature isolation in respect of the purification agent in the filter cartridge 9.

The filter insert 8 is rotatable in the depression 23 of the insulating insert 6 by means of coupling means which are generally identified by reference 32. Those coupling means are disposed on the one hand on the filter insert 8, more specifically being so-called filter insert limbs 33; and on the other hand in the form of rotary knob limbs 34 on a rotary knob 35 which is rotatable by way of the engagement of a rotary handle 36 in the lid 4.

FIG. 6 shows at the top the lid 4 and the rotary knob 35 with rotary handle 36, which is rotatable in the lid 4 about the dash-dotted axis 37, and a through opening 38 for the slider switch 16.

When, in the opened position in FIG. 6, the lid 4 is fitted onto the collecting pot 1, the rotary knob limbs 34 engage into the gaps between the filter insert limbs 33 in the manner shown in FIG. 7. From there on, even when the untreated water region C is filled with water the filter insert 8 can be rotated by rotating the rotary knob 35 in such a way that the through openings 7 can be brought out of alignment with the discharge openings 28. When a rotational movement of 90° for example of the rotary handle 36 is effected, that gives the position shown in FIG. 8. In that position the through opening 38 for the sliding switch 6 can no longer be seen. Instead, there is view onto the discharge opening 28 under the filter cartridge 9. The filtrate intermediate storage means 25 is closed outwardly.

If it is assumed that, in that closed position in FIG. 8 there is sufficient water in the boiling region A, then the slider switch 16 can be pushed into the through opening 38 which is positioned in suitable opposite relationship in such a way that the heating element 5 is switched on and heats up. That can avoid heated water passing back into the filtrate intermediate storage means 25 through the discharge opening 28 and the through opening 7.

List of references

| | |
|---|---|
| 1 | collecting pot |
| 2 | spout |
| 3 | handle |
| 4 | lid |
| 5 | electrical heating element |
| 6 | insulating insert |
| 7 | through opening |
| 8 | filter insert |
| 9 | cartridge |
| 10 | partition wall |
| 10a | horizontal part of the partition wall |
| 10b | vertically upwardly extending part of the partition wall |
| 11 | electrical plug base |
| 12 | electrical supply lead |
| 13 | electrical plug connector |
| 14 | plug protection arrangement |
| 15 | plug bars |
| 16 | electrical switch |
| 17 | cover of the spout |
| 18 | rotating mechanism |
| 20 | handle limb |
| 21 | lid handle |
| 22 | heating bottom |
| 23 | shaft-like depression |
| 24 | handle of the filter cartridge |
| 25 | filtrate intermediate storage means |
| 26 | bottom |
| 27 | discharge end of the filter cartridge |
| 28 | discharge opening |
| 29 | annular outlet passage |
| 30 | bottom of the shaft-like depression |
| 31 | plate-shaped insulating space |
| 32 | coupling means |
| 33 | support rib |
| 34 | support step |
| a | spacing |
| A | boiling region |
| B | insulating space |
| C | untreated water region |
| D | rear region of the collecting pot |

What is claimed is:

1. A water filter device having a collecting pot (1) with a spout (2) which is disposed at the top front, a handle (3) which is disposed at the rear in opposite relationship, and an electrical heating element (5) which is arranged in the lower boiling region (A) of the collecting pot (1), wherein the collecting pot (1) is closable at the top by a lid (4) and provided in the interior is a filter insert (8) in which a filter cartridge (9) which can be filled with a purification agent is arranged so that untreated water can be poured by way of the filter cartridge (9) into the filter insert (8) and can pass due to the force of gravity to at least below the filter cartridge (9), wherein the filter insert (8) is arranged in an insulating insert (6) in such a way that provided between the boiling region (A) in the collecting pot (1) and the filter insert (8) with the filter cartridge (9) is a partition wall (10, 10a) which is generally arranged at a spacing from the filter insert (8) and which is at least in part in the form of a substantially horizontally extending plate, and wherein provided in the lower region of the insulating insert (6) is a through opening (7) for the communication between the discharge end (27) of the filter cartridge (9) and the collecting pot (1), characterised in that the through opening (7) is arranged in the rear region (D) of the collecting pot (1) which is in opposite relationship to the spout (2), and the substantially horizontally extending part (10a) of the partition wall (10) is inclined rearwardly towards the through opening (7) and extends above the boiling region (A) at least partially over the cross-section of the collecting pot (1).

2. A water filter device according to claim 1 characterised in that the through opening (7) is provided with a closure means.

3. A water filter device according to claim 1 or claim 2 characterised in that the insulating insert (6) is in the form of an upwardly open cup and its bottom is formed by the substantially horizontal part (10a) of the partition wall (10).

4. A water filter device according to one of claims 1 to 2 characterised in that the substantially horizontal part (10a) of the partition wall (10) extends substantially over the entire cross-section of the entire collecting pot (1) in such a way that an insulating space (B) is disposed under the untreated water region (C) and above the boiling region (A).

5. A water filter device according to one of claims 1 to 2 characterised in that provided in the plate-shaped partition wall (10a) of the insulating insert (6), which is inclined towards the through opening (7), is a shaft-like depression (23) in which are disposed the through opening (7) and the filter insert (8).

6. A water filter device according to one of claims 1 to 2 characterised in that the filter cartridge (9) is held at the spacing (a) from the bottom (26) of the filter insert (8), forming a filtrate intermediate storage means (25), and provided beside the bottom of the filter insert (8) is a discharge opening (28) which can be brought into alignment with the through opening (7) in the insulating insert (6).

7. A water filter device according to one of claims 1 to 2 characterised in that the filter insert (8) is rotatable in the depression (23) of the insulating insert (6) and coupling means (32) are provided in the lid (4) for rotational actuation.

8. A water filter device according to one of claims 1 to 2 characterised in that a slider switch (16) arranged on the handle (3) can be brought into engagement with the coupling means (32) for rotational actuation.

\* \* \* \* \*